United States Patent [19]

Eida et al.

[11] 4,338,611

[45] Jul. 6, 1982

[54] LIQUID JET RECORDING HEAD

[75] Inventors: Tsuyoshi Eida, Chiba; Yohji Matsufuji; Yasuhiro Yano, both of Tokyo; Tokuya Ohta, Yokohama; Masahiro Haruta, Funabashi, all of Japan

[73] Assignee: Canon Kabushiki Kaisha, Tokyo, Japan

[21] Appl. No.: 186,581

[22] Filed: Sep. 12, 1980

[51] Int. Cl.[3] .............................................. G01D 15/16

[52] U.S. Cl. ........................................................ 346/75

[58] Field of Search ........................... 346/1.1, 75, 140

[56] References Cited

U.S. PATENT DOCUMENTS 3,243,122 3/1966 Snaper ................................ 239/102
3,281,859 10/1966 Stone .................................. 239/102
3,946,398 3/1976 Kyster et al. ..................... 346/75 X
3,972,474 8/1976 Keur ................................ 346/75 X
4,050,377 9/1977 Watanabe et al. ................ 346/75 X

*Primary Examiner*—Donald A. Griffin
*Attorney, Agent, or Firm*—Fitzpatrick, Cella, Harper & Scinto

[57] ABSTRACT

An improvement in a structure of a liquid jet recording head having a liquid ejecting portion constructed with an orifice side end part, at the tip end of which an orifice is provided to discharge liquid therefrom, an energy acting zone communicatively connected with the orifice and where energy acts on the liquid to form flying droplets, and a liquid inlet port side end part connected with the energy acting zone and having a liquid inlet port, through which the liquid is introduced into the energy acting zone.

8 Claims, 3 Drawing Figures

LIQUID JET RECORDING HEAD

BACKGROUND OF THE INVENTION

1. Field of the Invention

This invention relates to a recording head to be employed for a liquid jet recording method, in which recording is effected by formation of flying droplets.

2. Description of the Prior Art

Non-impact recording methods have recently drawn attention of all concerned in that noises generated at the time of the recording are low or negligible. Of these non-impact recording methods, the so-called "ink jet recording methods (or liquid ejecting recording methods)", which is capable of performing high speed recording, and of recording an image on plain paper without requiring any particular treatment of image fixing, is considered to be extremely useful recording method. Heretofore, various systems for the ink jet recording method have been devised, some of which have already been commercialized with necessary improvements having been incorporated, and others of which are still under way for their practical use.

Such liquid ejecting recording method is to effect the image recording by causing droplets of a recording liquid which is usually called "ink" to fly toward an image recording member and to adhere thereon, which method is largely classified into several systems depending on the method of generating the droplets of this recording liquid and the method of controlling the flying direction of the droplets thus generated.

Of various systems for the liquid ejecting recording method, those as described in U.S. Pat. Nos. 3,683,212, 3,946,398, and so forth, for example, are called the "drop-on-demand" recording methods which effect the image recording by causing the droplets to discharge and fly from a discharging orifice, and causing the droplets to adhere onto the image recording member surface. This drop-on-demand recording method has recently drawn a particular attention of all concerned for the reason that since only droplets necessary for the recording are discharged, no particular means is required for recovery or treatment of the discharged liquid which are not necessary for the recording with the consequence that the recording apparatus per se can be made in a simple construction and small size, the flying direction of the droplets discharged from the orifice needs not be controlled, polychromatic recording can be effected easily, and others.

Besides the abovementioned liquid jet recording method, laid-open Japanese patent application No. 54-59936 (corresponding to DOLS 2843064 and U.S. Ser. No. 948,236) discloses an entirely different liquid jet recording method in its droplets forming principle. This liquid jet recording method is not only applicable very effectively to the abovementioned drop-on-demand recording method, but also capable of readily embodying the recording head in the full line type, high density multi-orifice construction, hence it has such characteristic that an image of high image resolution and quality can be obtained at high speed.

The recording heads for use in these liquid jet recording methods are so designed in construction, and so provided with necessary devices, that each of the recording methods may exhibit its characteristics to the maximum possible extent, although they are common in their fundamental construction to be mentioned in the following.

That is, the liquid jet recording head to be used in these recording methods basically has a liquid discharging portion constructed with an orifice side end part having at its tip end an orifice for discharging liquid, an energy acting zone which is communicatively connected with the orifice and where energy acts on the liquid to form flying droplets, and an inlet side end part connected with the energy acting zone and having an inlet port to introduce the liquid into the energy acting zone.

The energy acting zone is such one that, in the case of the recording method as disclosed in U.S. Pat. Nos. 3,683,212 and 3,946,398, for example, an electro-mechanical transducer such as a piezoelectric element, etc. is provided in a mechanically coupled relationship, wherein, by pressure energy (pressure wave) generated by an input recording signal into the electro-mechanical transducer, the droplets are discharged and flown to effect the recording. According to one of the recording methods as disclosed in the laid-open Japanese patent application No. 54-59936, an electro-thermal transducer is provided at the energy acting zone, and discharging and flying of the droplets for recording are effected by heat energy to be generated by application of an input recording signal to the transducer. Further, according to another recording method as disclosed in this laid-open patent application No. 54-59936, no particular means is provided at the energy acting zone, but electromagnetic wave energy such as laser, etc. is irradiated onto the energy acting zone to cause it to be absorbed in the liquid at this energy acting zone to thereby generate heat, by the heat generating action of which the droplets are discharged and flown for recording.

According to the recording methods as disclosed in this laid-open patent application No. 54-59936, the heat energy is caused to act on the liquid in the manner as mentioned above to obtain the driving force for the droplets discharging. In more detail, the liquid which has been subjected to the action of the heat energy brings about the state change accompanying abrupt increase and decrease in the liquid volume, i.e., generation of bubbles and decrease in the volume of the bubbles as generated, and, by the force of action based on the state change, droplets are discharged and flown from the orifice at the tip end of the orifice side end part, and adhere onto an image recording member for recording.

Thus, the liquid jet recording method described in the foregoing obtains the driving force for the droplets discharge by causing the pressure energy or heat energy to act on the liquid at the energy acting zone. Accordingly, it is necessary that such energy act on the liquid in a manner to be efficiently spent for the droplets discharge.

In the case of continuous recording, it is necessary that formation of the flying droplets be repeatedly done in exact response to the recording signal. In particular, in the case of high speed recording, this repetition of the droplets formation should be done faithfully and quickly in accordance with the recording signal to be imparted to the energy acting zone.

Furthermore, in order to improve the quality of the recorded image and to make it possible to perform the recording at high speed, it is necessary that the droplets discharging direction be stabilized, satellite droplets be prevented from occurring, the repeated droplets discharging be done stably and continuously over a long period of time, the droplets forming frequency (number of droplets to be formed per unit time=frequency of the droplets formation per unit time) be improved, and various other improvements in the characteristics for the stabilized droplets formation be attempted.

Unfortunately, however, all these requirements as mentioned above cannot be said to have been solved satisfactorily in the conventional methods.

SUMMARY OF THE INVENTION

It is therefore an object of the present invention to provide an excellent liquid jet recording head which can successfully solve the abovementioned various problems in the conventional liquid jet recording head, and in which the droplets forming characteristics and the droplets forming stability have been improved; particularly, improvements in these characteristics at the time of the high speed recording.

According to the present invention, generally speaking, there is provided a liquid jet recording head provided with a liquid discharging section constructed with an orifice side end part having an orifice at its tip end for discharging liquid, an energy acting zone which is communicatively connected with the orifice and in which energy for discharging the liquid acts on the liquid, and a liquid inlet side end part connected with the energy acting zone and having an inlet port for introducing the liquid into the energy acting zone, wherein said recording head has a construction such that the following relationship is established:

$$\frac{1}{100} \leq \frac{a}{b} \leq \frac{1}{2}$$

when the length from the orifice to the liquid inlet port is L; the length of said energy acting zone along the moving direction of the liquid is l; the length from said orifice to said energy acting zone is a; and the length from said liquid inlet port to said energy acting zone is b; and that the length L is determined in a range of from 0.1 mm to 5 mm, and the length l is determined in a range of from 10 μm to 800 μm.

BRIEF DESCRIPTION OF THE DRAWINGS

In the accompanying drawings:

FIGS. 1A, 1B and 1C illustrate a preferred embodiment of the liquid jet recording head according to the present invention, wherein FIG. 1A is a schematic perspective view, in longitudinal cross-section, of the liquid jet recording head;

FIG. 1B is a schematic front view, with one part thereof being enlarged, of the liquid jet recording head shown in FIG. 1A;

and FIG. 1C is a schematic partial view, in longitudinal cross-section, of the liquid jet recording head when it is viewed along a dot-and-dash line X-Y in FIG. 1B.

DESCRIPTION OF THE PREFERRED EMBODIMENT

In an attempt to achieve the foregoing object of the present invention, the inventors have designed and manufactured various models of the recording head in respect of relationship between the recording head structure and the droplets forming characteristic as well as the droplets forming stability, particularly, these characteristics at the time of high speed recording, and, with these specimens, they conducted various repeated experiments and studies. As the result of such strenuous efforts, they have succeeded in solving all the problems as mentioned in the foregoing, wherein the recording head is designed and manufactured on the basis of established positional and dimensional relationships among the orifice side end part, the energy acting zone, and the liquid inlet side end part, all of which constitute the liquid discharging section of the recording head to be mentioned in the following.

The basic concept of designing the recording head according to the present invention can be adopted extremely effectively for designing the recording head to be used for the recording method disclosed in the laid-open Japanese patent application No. 54-59936 which will be mainly taken up in the ensuing description as the typical example.

Figure 1A:
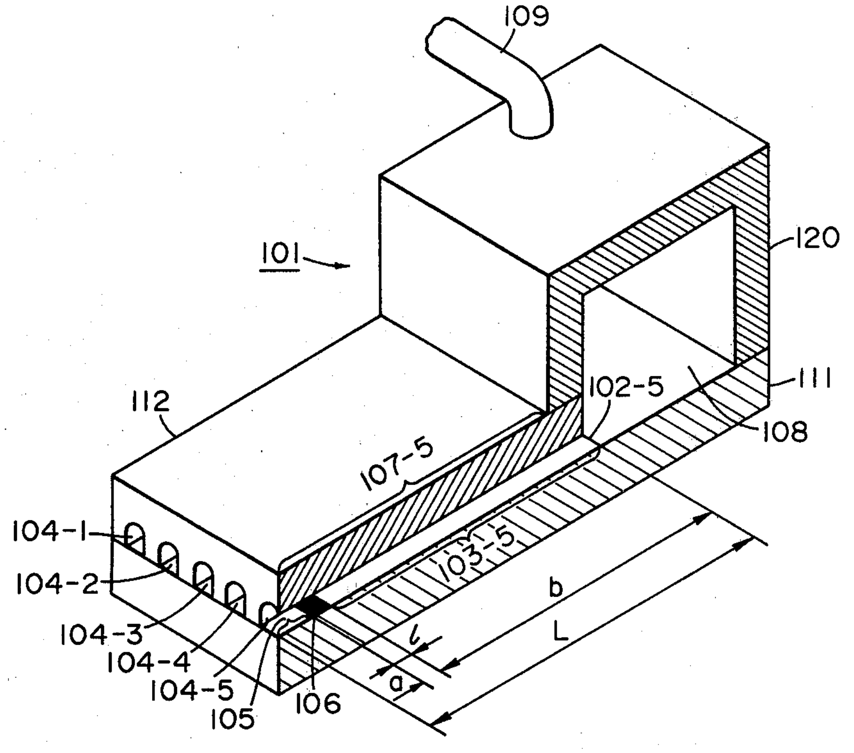
Figure 1B:
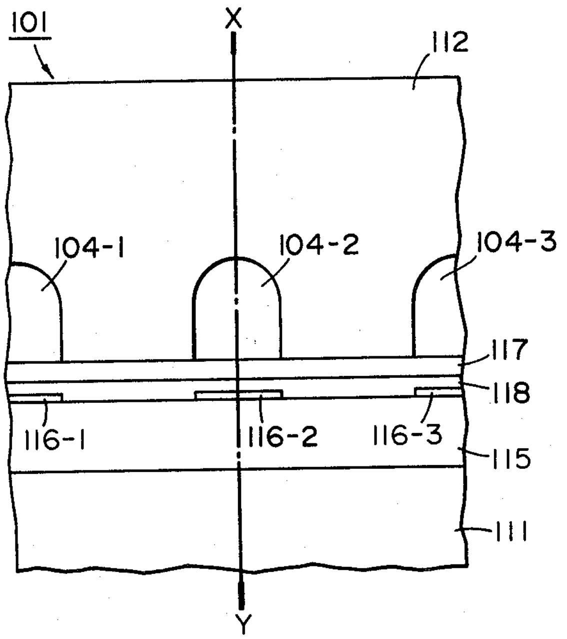
Figure 1C:
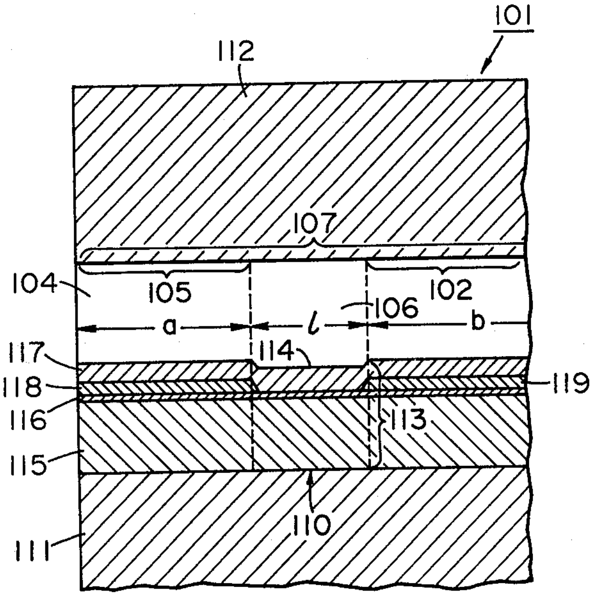

FIGS. 1A, 1B and 1C illustrate one preferred embodiment of the recording head according to the present invention, which is one applicable to the recording method as disclosed in the laid-open Japanese patent application No. 54-59936, wherein its effect can be exhibited to the maximum degree. The recording method is used as an example to avoid any complexity in the description throughout the specification. It should, however, be noted that the present invention is not necessarily restricted to the recording head, to which this kind of recording method is applied.

Referring now to the drawing, the recording head 101 has a plurality of liquid discharging sections 107, each being constructed with an orifice side end part 105 having at its tip end an orifice 104 to discharge droplets in a predetermined direction, the energy acting zone 106 where the energy for forming the flying droplets acts on the liquid, and the liquid inlet port side end part 103 having an inlet port 102 for introducing the liquid into the energy acting zone 106. The liquid discharging section 107 is communicatively connected at the liquid inlet port 102 with a common liquid feeding chamber 108. On the top part of the common liquid feeding chamber 108, there is connected a liquid feeding pipe 109 which is made of a visco-elastic material such as vinyl chloride resin, and so forth, through which liquid is fed into the common liquid feeding chamber from a liquid reservoir (not shown) provided at a separate location.

The liquid feeding to each energy acting zone 106 constituting the liquid discharging section 107 is effected from the common liquid feeding chamber 108 through the liquid inlet port 102 of each liquid inlet port side end part 103 connected with the common liquid feeding chamber 108.

According to the recording head 101 as illustrated, since each liquid discharging section 107 can be designed and manufactured in such a manner that it may be arranged substantially parallel with the same density as the orifice density, and that the liquid inlet port may be communicatively connected with the common liquid feeding chamber 108, and, moreover, since the orifice density can be made the same as the density of the recorded image, there can be obtained a recording head of extremely compact structure.

The recording head 101 as illustrated has such a construction that the orifice 104, a plurality of liquid discharging sections 107, and the common liquid feeding chamber 108 are formed by covering the surface of a base plate 111 having on the surface the electro-thermal transducer 110 with a grooved plate 112 provided therein with predetermined numbers of grooves, each having a predetermined width and depth, with a predetermined linear density as well as a liquid feeding chamber constituting plate 120 having a groove for constructing the common liquid feeding chamber 108. In the case of the recording head 101 as illustrated, the orifice 104 is shown to be plural in number. It should, however, be noted that the invention is not limited to this plurality of orifice arrangement, but the recording head with a single orifice may sufficiently fall under the category of the present invention.

Furthermore, in the case of the recording head 101 shown in FIG. 1, the energy acting zone 106 constituting the liquid discharging section 107 is the place where heat energy to be generated from the electro-thermal transducer 110 acts on the liquid at this energy acting zone 106 to cause bubbling, and the bubbles bring about abrupt state change due to expansion and contraction of the volume thereof. This energy acting zone is therefore called the heat acting zone for the purpose of the present invention.

The energy acting zone 106 is positioned on the upper part of the heat energy generating section 113 in the electro-thermal transducer 110, and a heat energy acting surface 114 to contact the liquid at the heat energy generating section 113 constitutes the bottom surface.

The heat energy generating section 113 is constructed with a lower layer 115 provided on the base plate 111, a heat generating resistive layer 116 provided on the lower layer 115, and an upper layer 117 provided on the heat generating resistive layer 116. The heat generating resistive layer 116 is further provided on its surface with electrodes 118, 119 to conduct electricity through the layer 116 for heat generation. The electrode 118 is such one that is common to the heat energy generating section at each liquid discharging section, while the electrode 119 is a selective electrode for generating heat by selection of the heat generating section at each liquid discharging section, both being provided along the liquid flow path in the liquid discharging section.

The upper layer 117 is to isolate the heat generating resistive layer 116 from the liquid in the liquid discharging section 107 for protecting, both chemically and physically, the heat generating resistive layer 116 from the liquid to be used, and, at the same time, has a function protective of the heat generating resistive layer 116 which prevents short-circuiting from occurring between the electrodes 118, 119 through the liquid.

While the upper layer 117 possesses such function as mentioned above, it is not always necessary to provide this layer, if the heat generating resistive layer 116 has the liquid-resistant property and it brings about no apprehension at all as to the electrodes 118, 119 being electrically short-circuited through the liquid, but it may be designed as the electro-thermal transducer of a construction, in which the liquid directly contacts the surface of the head generating resistive layer 116.

The lower layer 115 mainly has the flow control function of heat. In more detail, at the time of the droplet discharge, the rate of transmission of heat generated at the heat generating resistive layer 116 becomes larger to the side of the heat acting zone 106 than to the side of the base plate 111 with the consequence that, after the droplet discharge, i.e., after the electric conduction to the heat generating resistive layer 116 is stopped, the heat at the heat acting zone 106 and the heat generating section 113 is quickly discharged to the side of the base plate 111, and the liquid and the bubbles as generated at the heat acting zone 106 become quenched. The lower layer 115 is provided for this purpose.

Needless to say, in case electromagnetic wave such as laser, etc. is irradiated on the energy acting zone 106 to cause the electromagnetic wave to be absorbed in the liquid at the energy acting zone 106 and to generate heat, the above-mentioned electro-thermal transducer 110 needs not be provided.

Now assume that a length of the liquid flow path in the liquid discharging section 107, i.e., a length of the liquid flow path from the orifice 104 to the liquid inlet port 102, is L, a length of the liquid flow path (front liquid flow path) from the orifice 104 to the energy acting zone 106 is a, a length of the liquid flow path (rear liquid flow path) from the energy acting zone 106 to the liquid inlet port 102 is b, and a length of the energy acting zone 106 in the direction along the moving direction of the liquid (in case the heat generating body is provided, it is the length of the heat generating section along the direction of the flow path, while, in the case of the recording head of a type which irradiates laser, etc., it is the length of the irradiating surface along the direction of the flow path) is l, there is established an equational relationship of $$\frac{1}{100} \leqq \frac{a}{b} \leqq \tfrac{1}{2},$$

and the liquid jet recording head is designed and manufactured with the actual dimension of L being not less than 0.1 mm but not more than 5 mm, and l being not less than 10 μm but not more than 800 μm.

By so designing the construction of the recording head, there may be realized various advantages such that the energy to be generated at the energy acting zone by application of the recording signal efficiently acts on the liquid at the energy acting zone and the motive force for the droplets discharge which has been generated by the action of energy is effectively used for the droplets discharge; high frequency recording signals can be supplied to the energy acting zone; stability of the discharging direction and prevention of satellite droplets to occur can be attained; the liquid can be supplied to the energy action zone with smoothness, uniformity, and stability, and others.

While the liquid jet recording head according to the present invention is designed and manufactured with the abovementioned dimensional range of L and l and with a and b to satisfy the abovementioned equational relationship, it may further preferably be disigned and manufactured with the following parameters.

a/b . . . for its lower limit, it is 1/50; and for its upper limit, it is 1/5.

L . . . for its lower limit, it is preferably 0.2 mm and above, and optimumly 0.5 mm and above; for its upper limit, it is preferably 4 mm and below, and optimumly 3 mm and below.

l . . . for its lower limit, it is 50 μm and above, and optimumly 80 μm and above; for its upper limit, it is preferably 500 μm and below, and optimumly 400 μm and below.

In order to exhibit the excellent characteristics of the liquid recording head disigned and fabricated in accordance with the concept of the present invention, production steps for manufacturing the recording head of the same construction as shown in FIG. 1 will be outlined hereinbelow.

An $SiO_2$ layer is formed on an alumina base plate 111 by sputtering to a thickness of 4 μm, after which $HfB_2$ and Al are sequentially sputtered on the $SiO_2$ layer. Thereafter, 16 pieces each of the electrodes 118 and 119 and the electro-thermal transducer 110 having the rectangular heat energy acting surface 114 of 40 μm×l are formed by the etching treatment for a pitch of 60 μm. In this way, the base plate member is produced. On this base plate member, there is laminated by sputtering an $SiO_2$ layer as the upper layer. The length l is set within a range of 10 to 800 μm, as will be described hereinafter, and the electro-thermal transducers having the heat energy acting surface of various sizes are formed.

In the next place, there are fabricated a grooved glass plate 112 with groves formed therein, each being 40 μm in width, 40 μm in depth, 60 μm in pitch, and a length L, to constitute the liquid discharging section, and a common liquid feeding chamber plate 120 provided with a groove to form the common liquid feeding chamber 108.

With the abovementioned component members in hand, the base plate member, the grooved plate 112, and the common liquid feeding chamber plate 120 are joined together to complete the recording head.

Table 1 below indicates the measured results of the droplets discharge stability, the continuous liquid discharge characteristics, the droplet forming frequency characteristics, and so on of the recording heads (Specimen No. 1 to No. 22) manufactured by the above outlined steps.

TABLE 1

| SPECIMEN NO. | a (μm) | b (mm) | l (μm) | L (mm) | MATERIAL FOR HEAT GENERATING RESISTIVE LAYER | RECORDING LIQUID USED | STABILITY IN DROPLET DISCHARGING | CHARACTERISTIC IN CONTINUOUS DROPLET DISCHARGING | FREQUENCY CHARACTERISTIC FOR DROPLET FORMATION |
|---|---|---|---|---|---|---|---|---|---|
| 1 | 600 | 1.2 | 200 | 2 | $HfB_2$ | Methyl cellosolve type ink | Δ | Δ | Stable discharge at 500Hz |
| 2 | 300 | 1.5 | " | " | " | Methyl cellosolve type ink | O | O | Stable discharge at 1KHz |
| 3 | 35 | 1.77 | " | " | " | Methyl cellosolve type ink | ◎ | ◎ | Stable discharge at 2.2KHz |
| 4 | 18 | 1.78 | " | " | " | Methyl cellosolve type ink | O | ◎ | Stable discharge at 1.9KHz |
| 5 | 5 | 0.045 | 50 | 0.1 | " | Ethanol type ink | Δ | Δ | Stable discharge at 160Hz |
| 6 | 5 | 0.095 | 100 | 0.2 | " | Ethanol type ink | Δ | O | Stable discharge at 1.8KHz |
| 7 | 20 | 0.38 | " | 0.5 | " | Ethanol type ink | O | O | Stable discharge at 2.2KHz |
| 8 | 145 | 2.76 | " | 3 | " | Ethanol type ink | ◎ | ◎ | Stable discharge at 2KHz |
| 9 | 195 | 3.71 | 100 | 4 | " | Ethanol type ink | O | O | Stable discharge at 1KHz |
| 10 | 245 | 4.66 | " | 5 | " | Ethanol type ink | Δ | Δ | Stable discharge at 500Hz |
| 11 | 40 | 1.55 | 10 | 1.6 | " | Methanol type ink | Δ | Δ | Stable discharge at 100Hz |
| 12 | 39 | 1.52 | 50 | 1.6 | " | Methanol type ink | O | O | Stable discharge at 750Hz |
| 13 | 38 | 1.48 | 80 | " | " | Methanol type ink | ◎ | ◎ | Stable discharge at 3KHz |
| 14 | 30 | 1.17 | 400 | " | " | Benzyl alcohol type ink | ◎ | ◎ | Stable discharge at 4KHz |
| 15 | 27 | 1.07 | 500 | " | " | Benzyl alcohol type ink | O | ◎ | Stable discharge at 1.7KHz |
| 16 | 20 | 0.72 | 800 | " | " | Benzyl alcohol type ink | Δ | Δ | Stable discharge at 450Hz |
| 17 | 250 | 1.25 | 250 | 1.75 | " | Methanol type ink | O | ◎ | Stable discharge at 1KHz |
| 18 | 20 | 1 | 250 | 1.27 | " | Benzyl alcohol type ink | ◎ | ◎ | Stable discharge at 10KHz |
| 19 | 40 | 1.5 | 100 | 1.64 | " | Propyl alcohol type ink | ◎ | ◎ | Stable discharge at 1.5KHz |
| 20 | 70 | 2.0 | 300 | 2.47 | " | Propylene Carbonate type ink | ◎ | ◎ | Stable discharge at 5KHz |
| 21 | 40 | 1.0 | 250 | 1.29 | " | Ethanol/propylene carbonate type ink (1:1) | ◎ | ◎ | Stable discharge at 2KHz |
| 22 | 15 | 1.2 | 200 | 1.415 | " | Water/ethanol type ink (2:1) | O | ◎ | Stable discharge at 1.8KHz |

Standard for Evaluation:
Extremely good
O Good
Δ Practically satisfactory

What we claim is:

1. A liquid jet recording head comprising a liquid discharging section constructed with an orifice side end part having an orifice at its tip end for discharging liquid, an energy acting zone which is communicatively connected with said orifice and where energy for forming flying droplets acts on the liquid, a liquid inlet port side end part connected with the energy acting zone and having a liquid inlet port for introducing the liquid into said energy acting zone, and energy generating means for generating said energy, characterized in that the following dimensional relationship is established:

$$\frac{1}{100} \leqq \frac{a}{b} \leqq \frac{1}{2}$$

where the length of a liquid flow path from said orifice to said liquid inlet port is L; the length of said energy acting zone along the moving direction of the liquid is l; the length of a liquid flow path from said orifice to said energy acting zone is a; and the length of a liquid flow path from said liquid inlet port to said energy acting zone is b; and that said length L is not less than 0.1 mm and not more than 5 mm, and said length l is not less than 10 μm and not more than 800 μm.

2. The liquid jet recording head as set forth in claim 1, wherein said energy generating means is joined with said energy acting zone in such a relationship that energy to be generated may be effectively transmitted to the liquid filling said energy acting zone.

3. The liquid jet recording head as set forth in claim 2, wherein said energy generating means is an electro-thermal transducer.

4. The liquid jet recording head as set forth in claim 3, wherein said electro-thermal transducer comprises a heat energy generating section formed by laminating on a base plate a lower layer, a heat generating resistive layer, and an upper layer, in the named order as mentioned, and a set of electrodes to conduct electricity to said heat generating resistive layer.

5. A liquid jet recording head comprising:

(a) a plurality of liquid discharging sections having a front liquid flow path with an orifice at its tip end for discharging liquid, an energy acting zone which is communicatively connected with said liquid flow path and where energy for forming flying droplets acts on the liquid, and rear liquid flow path, through which the liquid is supplied into said energy acting zone to fill the same;

(b) a common liquid chamber communicated with a plurality of said rear liquid flow paths; and (c) energy generating means for generating said energy;

said liquid discharging section having a construction to satisfy the following dimensional requirements:

$$\frac{1}{100} \leqq \frac{a}{b} \leqq \frac{1}{2}$$

$$0.1 \leqq L \leqq 5$$

$$10 \leqq l \leqq 800$$

$$0.1 \leqq L \leqq 5$$

$$10 \leqq l \leqq 800$$

where a (μm) is the length of the front liquid flow path;

b (mm) is the length of the rear liquid flow path;

l (μm) is the length of the energy acting zone along the moving direction of the liquid; and L (mm) is a+b+l.

6. The liquid jet recording head as set forth in claim 5, wherein said energy generating means is joined with said energy acting zone in such a relationship that energy to be generated may be effectively transmitted to the liquid filling said energy acting zone.

7. The liquid jet recording head as set forth in claim 6, wherein said energy generating means is an electro-thermal transducer.

8. The liquid jet recording head as set forth in claim 7, wherein said electro-thermal transducer comprises a heat energy generating section formed by laminating on a base plate a lower layer, a heat generating resistive layer, and an upper layer, in the named order, and a set of electrodes to conduct electricity to said heat generating resistive layer.

* * * * *

UNITED STATES PATENT AND TRADEMARK OFFICE

CERTIFICATE OF CORRECTION

PATENT NO. : 4,338,611

DATED : July 6, 1982

INVENTOR(S) : TSUYOSHI EIDA, ET AL.

It is certified that error appears in the above-identified patent and that said Letters Patent is hereby corrected as shown below:

Claim 5, Column 10, lines 16 and 18, delete

"$0.1 \leqq L \leqq 5$ $10 \leqq 1 \leqq 800$ "

Signed and Sealed this

*Twenty-eighth* Day of *December 1982*

[SEAL]

*Attest:*

GERALD J. MOSSINGHOFF

*Attesting Officer* *Commissioner of Patents and Trademarks*